(12) United States Patent
Rowe

(10) Patent No.: US 11,597,811 B2
(45) Date of Patent: *Mar. 7, 2023

(54) METHODS FOR MAKING POLYMER-REINFORCED STEEL MATRIX COMPOSITES

(71) Applicant: Toyota Motor Engineering & Manufacturing North America, Inc., Plano, TX (US)

(72) Inventor: Michael Paul Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 115 days.

This patent is subject to a terminal disclaimer.

(21) Appl. No.: 16/872,641

(22) Filed: May 12, 2020

(65) Prior Publication Data

US 2020/0277466 A1 Sep. 3, 2020

Related U.S. Application Data

(62) Division of application No. 15/272,711, filed on Sep. 22, 2016, now Pat. No. 10,774,196.

(51) Int. Cl.
*C08K 3/08* (2006.01)
*B32B 15/14* (2006.01)

(52) U.S. Cl.
CPC ............... *C08K 3/08* (2013.01); *B32B 15/14* (2013.01); *C08K 2003/0856* (2013.01)

(58) Field of Classification Search
CPC .... B32B 15/14; C08K 3/08; C08K 2003/0856
(Continued)

(56) References Cited

U.S. PATENT DOCUMENTS

| 5,989,334 | A | 11/1999 | Dry |
| 7,491,356 | B2 | 2/2009 | Heikkila |

(Continued)

FOREIGN PATENT DOCUMENTS

| CN | 101057003 A | 10/2007 |
| CN | 102909381 A | 2/2013 |

(Continued)

OTHER PUBLICATIONS

Ha et al., "Fabrication of polyacrylonitrile stainless steel nanoparticle composite fibers," Abstracts, 69th Southwest Regional Meeting of the American Chemical Society, Waco, TX, SWMR-50, Nov. 16-19, 2013. (Year: 2013).*

(Continued)

*Primary Examiner* — Josephine L Chang
(74) *Attorney, Agent, or Firm* — Christopher G. Darrow; Darrow Mustafa PC

(57) ABSTRACT

Composite materials include a steel matrix with structural polymer integrated into the matrix. The composite materials have substantially lower density than steel, and are expected to have appreciable strength. Methods for forming composite steel composites includes combining a structural polymer component, such as a woven polymer, with steel nanoparticles and sintering the steel nanoparticles in order to form a steel matrix with structural polymer integrated therein.

19 Claims, 2 Drawing Sheets

(58) Field of Classification Search
USPC .......................................................... 524/440
See application file for complete search history.

(56) References Cited

U.S. PATENT DOCUMENTS

| | | |
|---|---|---|
| 7,785,392 B2 | 8/2010 | Shim et al. |
| 7,927,507 B1 | 4/2011 | Li et al. |
| 8,192,866 B2 | 6/2012 | Golightly et al. |
| 8,361,651 B2 | 1/2013 | Matsui |
| 8,372,177 B1 | 2/2013 | Thoma et al. |
| 8,395,003 B2 | 3/2013 | Leger et al. |
| 8,980,219 B1 | 3/2015 | Rowe et al. |
| 9,142,834 B2 | 9/2015 | Mohtadi et al. |
| 2005/0217427 A1 | 10/2005 | Suthersan et al. |
| 2009/0029148 A1 | 1/2009 | Hashimoto et al. |
| 2009/0090214 A1 | 4/2009 | Cheng |
| 2009/0264277 A1 | 10/2009 | Raj et al. |
| 2013/0084502 A1 | 4/2013 | Singh et al. |
| 2015/0068646 A1 | 3/2015 | Rowe |
| 2015/0096887 A1 | 4/2015 | McDonald et al. |
| 2015/0097649 A1 | 4/2015 | Rowe |
| 2015/0098882 A1 | 4/2015 | Rowe |
| 2015/0098884 A1 | 4/2015 | Rowe |
| 2015/0098885 A1 | 4/2015 | Rowe |
| 2015/0098886 A1 | 4/2015 | Rowe et al. |
| 2015/0098892 A1 | 4/2015 | Rowe et al. |
| 2015/0099118 A1 | 4/2015 | Mizuno et al. |
| 2015/0099135 A1 | 4/2015 | Mohtadi et al. |
| 2015/0099172 A1 | 4/2015 | Rowe et al. |
| 2015/0099182 A1 | 4/2015 | Singh et al. |
| 2015/0099183 A1 | 4/2015 | Singh et al. |
| 2016/0199916 A1 | 7/2016 | Rowe et al. |
| 2016/0200753 A1 | 7/2016 | Rowe et al. |

FOREIGN PATENT DOCUMENTS

| | | |
|---|---|---|
| DE | 112012001928 T5 | 2/2014 |
| JP | S621010202 A | 1/1987 |
| JP | 2006152376 A | 6/2006 |
| JP | 2010186606 A | 8/2010 |
| JP | 2012038697 A | 2/2012 |
| JP | 2013073839 A | 4/2013 |
| JP | 2013131366 A | 7/2013 |
| WO | 2012007830 A1 | 1/2012 |
| WO | 2013056185 A1 | 4/2013 |
| WO | 2013063161 A2 | 5/2013 |

OTHER PUBLICATIONS

Harris, "X. Quantitative Measurement of Preferred Orientation in Rolled Uranium Bars", Sep. 1951, pp. 113-123, pp. 113-123 Ser. 7, vol. 43, No. 336.

Mamura et al., "Dehydriding of Sn/MgH2 nanocomposite formed by ball milling of MgH2 with Sn", Int. J. Hydrogen Energy, Jul. 2007, pp. 4191-4194, vol. 32.

Dang, Z., et al., "Novel Ferroelectric Polymer Composites with High Dielectric Constants," Advanced Materials, Oct. 2003, pp. 1625-1629, vol. No. 19.

Schüth et al., "Light Metal Hydrides and Complex Hydrides for Hydrogen Storage", Chem Commun, Sep. 2004, pp. 2249-2258, Issue 20.

Fu, W., et al., "Preparation and Magnetic Characterization of Core-Shell Structure Stainless Steel/Silica Nanoparticles," Science Direct Materials Letters 60, 2006, pp. 1728-1732.

Varin et al., "The Effects of Ball Milling and Nonmetric Nickel Additive on the Hydrogen Desorption from Lithium Borohydride and Manganese Chloride (3LiBH4 + MnCl2) Mixture", 2010, Int. J. Hydrogen Energy, pp. 3588-3597, vol. 35.

Wronski et al., "A New Nanonickel Catalyst for Hydrogen Storage in Solid-state Magnesium Hydrides", 2011, Int. J. Hydrogen Energy, pp. 1159-1166, vol. 36.

Al-Sulaiman, F., et al., "Laser Cutting of Kevlar and Mild Steel Composite Structure: End Product Quality Assessment," Journal of Materials Engineering and Performance, Feb. 2007, pp. 22-29, ASM International, vol. 16(1).

Garrison et al., "Ferrous Alloys: Overview," Encyclopedia of Materials—Science and Technology, vols. 1-11, pp. 3127, 3131, Elsevier (2001).

Campbell, F.C., "Ch. 1: Introduction to Composite Materials", Structural Composite Materials (2010) 30 pages.

"Powder Metallurgy—Sintering Temperatures for Some Common Metals," by AZO Materials, available online at the time of this writing at the URL htt;s://www.azom.com/article.aspx?ArticleID=1727, Nov. 14, 2002, 2 pages.

Kevlar® Aramid Fiber Technical Guide, by E. I. du Pont de Nemours and Company, available online at the time of this writing at the URL http://www.dupont.com/content/dam/dupont/products-and-services/fabrics-fibers-and-nonwovens/fibers/documents/Kevlar_Technical_Guide.pdf, Jul. 2017, 24 pages.

\* cited by examiner

METHODS FOR MAKING POLYMER-REINFORCED STEEL MATRIX COMPOSITES

CROSS-REFERENCE TO RELATED APPLICATIONS

The present application is a Divisional of U.S. patent application Ser. No. 15/272,711, filed Sep. 22, 2016, incorporated herein by reference in its entirety.

TECHNICAL FIELD

The present disclosure generally relates to metal/polymer composite materials and, more particularly, to a lightweight composite of steel and a structural polymer, and method of making the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Light weight steel has numerous uses. In automobiles and airplanes, it will improve fuel efficiency by reducing the weight of the vehicle. Because mild steel has a density of 7.88 g/cm$^3$ and the density of certain polymers, such as aromatic polyamides, is about 2.1 g/cm$^3$, the composite of the two materials will have an overall reduced weight versus just steel, providing a lightweight material with considerable strength.

Steel is typically formed by conventional forging methods at temperatures in excess of 1000° C., whereas certain polymers, such as aromatic polyamides, undergo thermal decomposition at 450° C. Because steel is typically formed at temperatures much higher than the typical thermal decomposition temperatures of polymeric materials, a true composite having a structural polymer integrated into and bonded with a steel framework is difficult to form. Methods enabling formation of such a composite material would be desirable.

SUMMARY

This section provides a general summary of the disclosure, and is not a comprehensive disclosure of its full scope or all of its features.

In various aspects, the present teachings provide a composite material having a continuous steel matrix of sintered steel nanoparticles and at least one structural polymer that is at least partially encapsulated within the steel matrix. In some implementations, the at least one structural polymer is fully encapsulated within the continuous steel matrix. In some implementations, the composite material can have density less than 5 g/cm$^3$.

In other aspects, the present teachings provide a composite material. The composite material includes at least one structural polymer, and a continuous steel matrix, of sintered steel nanoparticles, disposed around the at least one structural polymer.

In still other aspects, the present teachings provide a method for forming composite steel. The method includes a step of providing steel nanoparticles and a step of combining steel nanoparticles with a structural polymer component to form an unannealed combination. The method further includes a step of sintering the steel nanoparticles around the structural polymer component by applying elevated temperature to the unannealed combination.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to composite materials including a steel matrix with a structural polymer integrated into the matrix. The composite materials have a substantially lower density than steel, and have appreciable strength. Methods for forming polymer-steel composites include combining a structural polymer component, such as an aromatic polyamide, with steel nanoparticles and sintering the steel nanoparticles in order to form a steel matrix with a structural polymer integrated therein.

Conventional steel melts at temperatures of greater than about 1200° C. Such high temperatures would instantly destroy various structural polymers on contact, which decomposes at about 450° C. or less. Accordingly, the present technology for forming a steel/polymer composite employs steel nanoparticles, lowering the melting point of steel to less than about 450° C. When combined and heated, this allows for the steel nanoparticles to sinter around the structural polymer component, without destroying the structural polymer component. The result is layer(s) or extending fibers of a structural polymer interpenetrated in a steel matrix.

A composite of the present disclosure can have significantly lower density than conventional steel, as low as 60% in one example. The composite can also provide considerable structural strength, including tensile strength.

Figure 1:
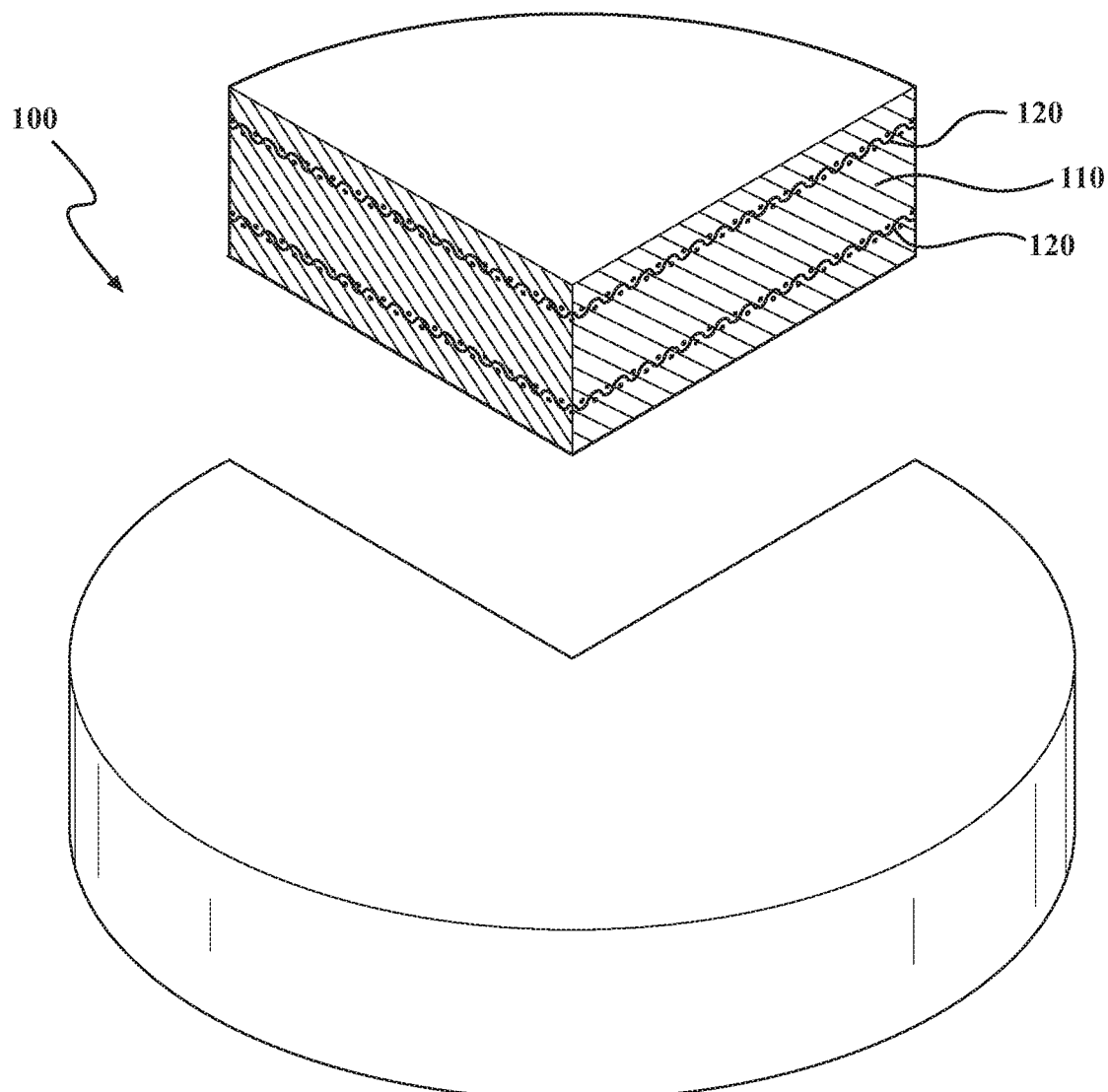
FIG. 1 is a cross section of composite steel having a steel matrix with two layers of structural polymer.

With reference to FIG. 1, a composite material 100 includes a continuous steel matrix 110 and at least one structural polymer 120 that is at least partially encapsulated within the steel matrix. As shown, the structural polymer 120 can be provided as a layer of fabric, cloth, weave, woven yarn, etc. In other instances, the structural polymer 120 can be provided as a fiber, yarn, or a plurality of aligned fibers. The composite material 100 will alternatively be referred to herein as composite steel 100. The continuous steel matrix 110 generally includes sintered steel nanoparticles, and compositionally includes an alloy of at least, iron and carbon. The continuous steel matrix 110 can optionally include any, several, or all, of: manganese, nickel, chromium, molybdenum, boron, titanium, vanadium, tungsten, cobalt, niobium, phosphorus, sulfur, and silicon. Relative ratios of the various elemental components of the steel matrix 110 can depend on the desired application, and will generally be selectable based on common knowledge to one of skill in the art. For example, an application requiring stainless steel can include chromium present at greater than or equal to 11%, by weight, of the total weight. In one disclosed Example, the steel matrix consists of iron, carbon, and manganese present at 99.08%, 0.17%, and 0.75%, respectively, by weight of the steel matrix. It will be understood that the term "weight" as used here is interchangeable with the term "mass".

In some implementations, the term "continuous", as used in the phrase, "continuous steel matrix 110" can mean that the steel matrix is formed as, or is present as, a unitary, integral body. In such implementations, and as a negative example, a structure formed of two distinct steel bodies held together such as with an adhesive or with a weld would be discontinuous. In some implementations, the term "continuous" as used herein can mean that a continuous steel matrix 110 is substantially compositionally and structurally homogeneous throughout its occupied volume. For simplicity, the continuous steel matrix 110 will be alternatively referred to herein as "steel matrix 110", i.e. the word "continuous" will at times be omitted without changing the meaning.

In many implementations, the structural polymer 120 can compositionally include an aromatic polyamide, or aramid. In some such implementations, the structural polymer 120 can include at least one of a p-aramid, such as KEVLAR™ (commercially available from E. I. du Pont de Nemours and Company), an m-aramid, and an o-aramid. In some implementations, the structural polymer 120 can include a copolymer of two or more of p-aramid, m-aramid, and o-aramid. In certain implementations, the structural polymer 120 can compositionally include an aliphatic polyamide.

In some implementations of the composite material 100, the at least one structural polymer 120 can be fully encapsulated within the continuous steel matrix 110. In various implementations, the expression, "encapsulated within the continuous steel matrix 110" can mean that the at least one structural polymer 120 is, partially or fully: encased in, enclosed in, enveloped in, integrated into, or otherwise contactingly surrounded by, the continuous steel matrix 110. In some implementations, the expression, "encapsulated within the continuous steel matrix 110" can mean that at least a portion of individual fibers comprising the at least one structural polymer 120 are contactingly surrounded by the continuous steel matrix 110. In some implementations, the expression, "encapsulated within the continuous steel matrix 110" can mean that the continuous steel matrix 110 is, partially or fully: formed around or otherwise contactingly disposed around the at least one structural polymer 120.

In some implementations, the expression stating that the at least one structural polymer 120 is "encapsulated within the steel matrix" means that the steel matrix 110 is formed around and within the structural polymer 120 with sufficiently high contact between surfaces of the steel matrix 110 and surfaces of the structural polymer 120 to hold the structural polymer 120 in place relative to the steel matrix 110. In some implementations, the expression stating that the structural polymer 120 is "encapsulated within the steel matrix" means that an interacting surface of the steel matrix 110 is presented to and bonded with all sides of individual polymer fibers that constitute the structural polymer 120.

In various implementations, the expression, "sufficiently high contact between surfaces of the steel matrix and surfaces of the structural polymer to hold the structural polymer in place relative to the steel matrix can mean that at least 50%, or at least 60%, or at least 70% or at least 80%, or at least 90% of the surface area of the structural polymer 120 is contacted by the steel matrix.

In general, the composite material 100 will have a total density that is less than the density of pure steel. For example, mild steel such as AISI grades 1005 through 1025 has a density of about 7.88 g/cm$^3$. In contrast, an exemplary composite steel 100 of the present disclosure has a density of 4.8 g/cm$^3$, about 61% of the density of mild steel. In comparison to this, recently developed steel-aluminum alloys have a density approximately 87% that of mild steel.

While FIG. 1 illustrates a composite material 100 having two layers of structural polymer 120 encapsulated within the steel matrix 110, it is to be understood that the composite material can include any number of layers of structural polymer 120 greater than or equal to one. Stated alternatively, the at least one structural polymer 120 can, in some implementations, include a plurality of mutually contacting or spatially separated layers of structural polymer. It is further to be understood that the weight ratio of structural polymer 120 to steel matrix 110 within the composite material 100 can be substantially varied, and that such variation will have a direct influence on the density of the composite material 100 given the considerably different densities of various polymers, such as aromatic polyamides (about 2.1 g/cm$^3$), and steel.

Thus, in some implementations, a composite material 100 of the present disclosure will have density less than 7 g/cm$^3$. In some implementations, a composite material 100 of the present disclosure will have density less than 6 g/cm$^3$. In some implementations, a composite material 100 of the present disclosure will have density less than 5 g/cm$^3$.

Figure 2:
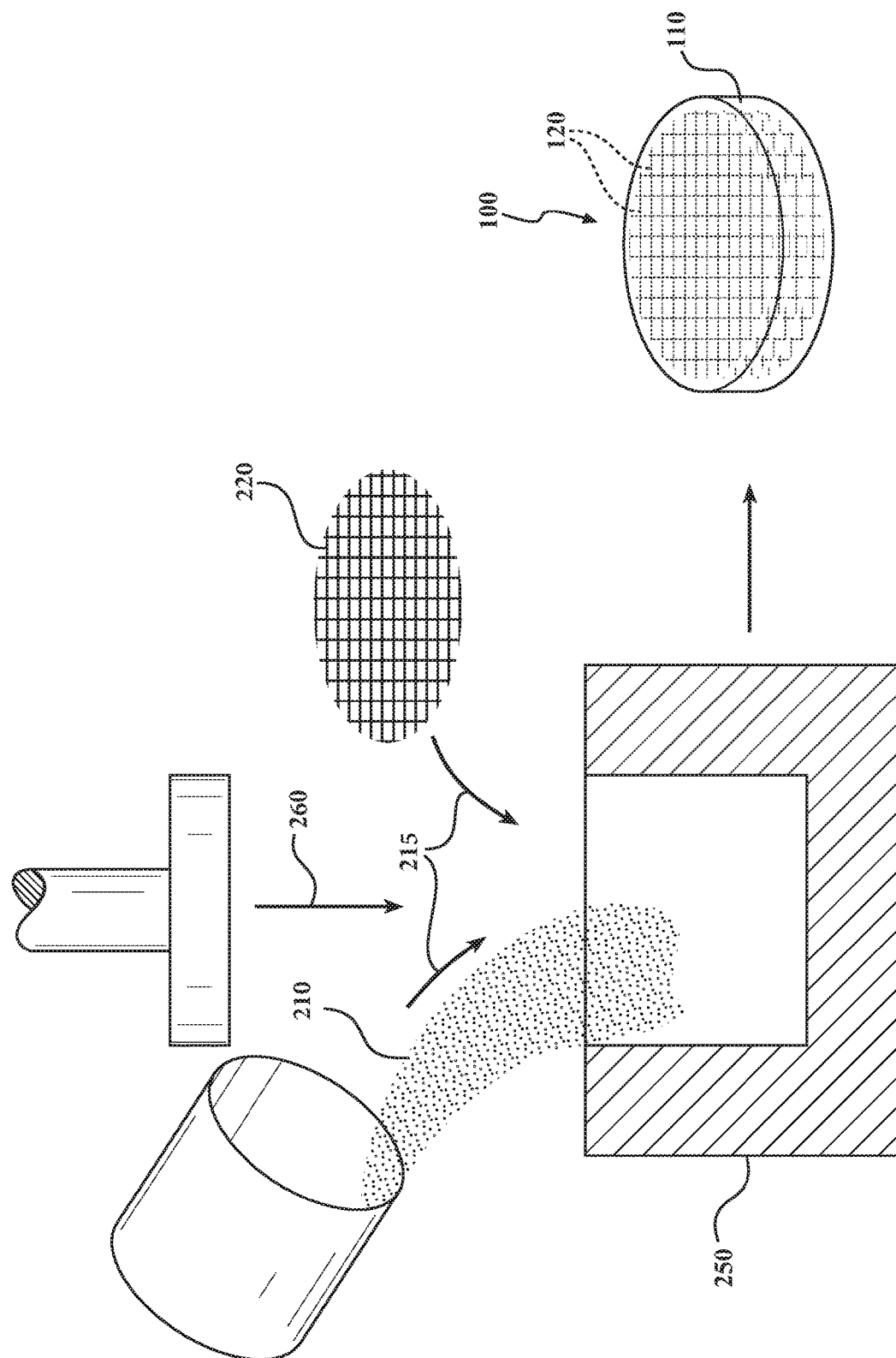
FIG. 2 is a pictorial view of a portion of a method for forming a composite material of the type shown in FIG. 1.

Also disclosed is a method for forming composite steel 100. With reference to FIG. 2, the method includes a step of providing steel nanoparticles 210. The term "steel nanoparticles 210" refers generally to a sample consisting predominantly of particles of steel having an average maximum dimension less than 100 nm. Individual particles of the steel nanoparticles 210 will generally consist of any alloy as compositionally described above with respect to the steel matrix 110 of the composite 100. As such, individual particles of the steel nanoparticles 210 will generally include iron and carbon; and can optionally include any, several, or all, of: manganese, nickel, chromium, molybdenum, boron, titanium, vanadium, tungsten, cobalt, niobium, phosphorus, sulfur, and silicon.

As described above with respect to the steel matrix 110 of a composite material 100, relative ratios of the various elemental components of the steel nanoparticles 210 can depend on the desired application, and will generally be selectable based on common knowledge to one of skill in the art. In a disclosed Example, the individual particles of the steel nanoparticles 210 consist of iron, carbon, and manganese present at 99.08%, 0.17%, and 0.75%, respectively, by weight.

In various aspects, the average maximum dimension of the steel nanoparticles 210 can be determined by any suitable method, including but not limited to, x-ray diffraction (XRD), Transmission Electron Microscopy, Scanning Electron Microscopy, Atomic Force Microscopy, Photon Correlation Spectroscopy, Nanoparticle Surface Area Monitoring, Condensation Particle Counter, Differential Mobility Analysis, Scanning Mobility Particle Sizing, Nanoparticle Tracking Analysis, Aerosol Time of Flight Mass Spectroscopy, or Aerosol Particle Mass Analysis.

In some implementations, the average maximum dimension will be an average by mass, and in some implementations will be an average by population. In some instances, the steel nanoparticles 210 can have an average maximum dimension less than about 50 nm, or less than about 40 nm, or less than about 30 nm, or less than about 20 nm, or less than about 10 nm.

In some aspects, the average maximum dimension can have a relative standard deviation. In some such aspects, the relative standard deviation can be less than 0.1, and the steel nanoparticles 210 can thus be considered monodisperse.

With continued reference to FIG. 2, the method for forming composite steel 100 additionally includes a step of combining 215 the steel nanoparticles 210 with a structural polymer component 220 to produce an unannealed combination. The structural polymer component 220 is in all respects identical to the structural polymer 120 as described above with respect to a composite material 100, with the exception that the structural polymer component 220 is not yet integrated into, or encapsulated within, a steel matrix 110 as defined above. Thus, the structural polymer component 220 can include, for example, a p-aramid, m-aramid, o-aramid, or copolymer thereof, formed in any configuration designed to impart tensile strength in at least one dimension, in some aspects in at least two-dimensions.

In many implementations, the combining step 215 will include sequentially combining at least one layer of steel nanoparticles 210 and at least one layer of structural polymer component 220, such that the unannealed combination consists of one or more layers each of steel nanoparticles 210 and structural polymer component 220. Any number of layers of steel nanoparticles 210 and any number of layers of structural polymer component 220 can be employed. It will be understood that in implementations where structural polymer 120 is desired at an exterior surface of the composite 100, a structural polymer component 220 will be the first and/or last sequentially layered component in the unannealed combination; and in implementations were structural polymer 120 is desired between exterior surfaces of the composite 100, a layer of structural polymer component 220 will be preceded and followed by a layer of steel nanoparticles 210.

The combining step 215 will generally include combining the steel nanoparticles 210 and the structural polymer component 220 within a die, cast, mold, or other shaped structure having a void space corresponding to the desired shape of the composite material 100 to be formed. In some particular implementations, the at least one layer of steel nanoparticles 210 and the at least one layer of structural polymer component 220 will be combined within a heat press die 250.

In some implementations, the method for forming composite steel 100 can include a step of manipulating steel nanoparticles 210 in the unannealed combination into interstices in the structural polymer component 220. Such a manipulating step can be effective to maximize surface area of contact between steel nanoparticles 210 and the structural polymer component 220 in the unannealed combination, improving the effectiveness of integration of the structural polymer 120 into the steel matrix 110 of the eventually formed composite material 100. Manipulating steel nanoparticles 210 into interstices in the structural polymer component 220 can be accomplished by any procedure effective to increase surface area of contact between steel nanoparticles 210 and structural polymer component 220, including without limitation: pressing, agitating, shaking, vibrating, sonicating, or any other suitable procedure.

The method for forming composite steel 100 additionally includes a step of sintering the steel nanoparticles 210, converting the steel nanoparticles 210 into a steel matrix 110 such that the structural polymer component 220 becomes structural polymer 120 integrated into the steel matrix 110; and thus converting the unannealed combination into composite steel 100. The sintering step generally includes heating the unannealed combination to a temperature less than 450° C. and sufficiently high to sinter the steel nanoparticles 210. In some implementations, the sintering step can include heating the unannealed combination to a temperature greater than 400° C. and less than 450° C. In some implementations, the sintering step can include heating the unannealed combination to a temperature greater than 420° C. and less than 450° C.

In some implementations, the sintering step can be achieved by hot compaction, i.e. by applying elevated pressure 260 simultaneous to the application of elevated temperature. In some implementations employing hot compaction, the elevated pressure can be at least 30 MPa; and in some implementations, the elevated pressure can be at least 60 MPa. Depending on the sintering conditions of temperature and pressure, the duration of the sintering step can vary. In some implementations, the sintering step can be performed for a duration within a range of 2-10 hours, and in one disclosed Example is performed for a duration of 4 hours.

It will be appreciated that in some instances, providing steel nanoparticles 210 having a desired composition, average maximum dimension, and/or relative standard deviation of the average maximum dimension may be difficult to achieve by conventional methods. For example, "top down" approaches involving fragmentation of bulk steel into particulate steel via milling, arc detonation, or other known procedures will often provide steel particles that are too large and/or too heterogeneous for effective sintering into a uniform, robust steel matrix 110. "Bottom up" approaches, such as those involving chemical reduction of dissolved cations, will often be unsuitable for various alloy nanoparticles due to incompatible solubilities, or even unavailability, of the relevant cations. For example, cationic carbon, that is suitable for chemical co-reduction with cationic iron to form steel, may be difficult to obtain. Further, even where these techniques or others may be effective to produce steel nanoparticles 210 of a given composition at laboratory scale, scale up may prove unfeasible or uneconomical.

For these reasons, the step of providing steel nanoparticles 210 can in many implementations be performed by a novel steel nanoparticle 210 synthesis using Anionic Element Reagent Complexes (AERCs). An AERC generally is a reagent consisting of one or more elements in complex with a hydride molecule, and having a formula:

$$Q^0 \cdot X_y \qquad \text{Formula I,}$$

wherein $Q^0$ represents a combination of one or more elements, each formally in oxidation state zero and not necessarily in equimolar ratio relative to one another; X represents a hydride molecule, and y is an integral or fractional value greater than zero. An AERC of Formula I can be formed by ball-milling a mixture that includes: (i) powders of each of the one or more elements, present at the desired molar ratios; and (ii) a powder of the hydride molecule, present at a molar ratio relative to the combined one or more elements that corresponds to y. In many implementations, the hydride molecule will be a borohydride, and in some specific implementations the hydride molecule will be lithium borohydride.

Contacting an AERC of Formula I with a suitable solvent and/or ligand molecule will result in formation of nanoparticles consisting essentially of the one or more elements, the one or more elements being present in the nanoparticles at ratios equivalent to which they are present in the AERC.

Thus, an AERC suitable for use in steel nanoparticle 210 synthesis generally has a formula:

  Formula II, where Fe is elemental iron, formally in oxidation state zero; C is elemental carbon, formally in oxidation state zero; M represents one or more elements in oxidation state zero, each of the one or more elements selected from a group including Mn, Ni, Cr, Mo, B, Ti, V, W, Co, Nb, P, S, and Si; X is a hydride molecule as defined with respect to Formula I; a is a fractional or integral value greater than zero; b is a fractional or integral value greater than zero; d is a fractional or integral value greater than or equal to zero; and y is a fractional or integral value greater than or equal to zero. It will be appreciated that the values of a, b, and c will generally correspond to the molar ratios of the various components in the desired composition of steel. It is further to be understood that M and d are shown as singular values for simplicity only, and can correspond to multiple elements present at non-equimolar quantities relative to one another. An AERC of Formula II can alternatively be referred to as a steel-AERC.

Formation of a steel-AERC can be accomplished by ball-milling a mixture that includes: (I) a powder of a hydride molecule, such as lithium borohydride; and (II) a pre-steel mixture that includes (i) iron powder; (ii) carbon powder; and (iii) optionally, powder(s) of one or more elements selected from a group including Mn, Ni, Cr, Mo, B, Ti, V, W, Co, Nb, P, S, and Si. This mixture is to include iron powder, carbon powder, and optional powder(s) of one or more selected elements, at weight ratios identical to the weight ratios of these various components in a desired steel product. For example, in order to synthesis a stainless steel type 316 product having, by weight, 12% Ni, 17% Cr, 2.5% Mo, 1% Si, 2% Mn, 0.08% C, 0.045% P, and 0.03 S, the pre-steel mixture, to be combined with powder of a hydride molecule for ball milling, should include powders of each of these elements present in the listed percentages by weight.

Thus, in some implementations, a disclosed process for synthesizing steel nanoparticles includes a step of contacting a steel-AERC, such as one defined by Formulae I or II, with a solvent. In some implementations, the disclosed process for synthesizing steel nanoparticles includes a step of contacting a steel-AERC, such as one defined by Formulae I or II, with a ligand. In some implementations, the disclosed process for synthesizing steel nanoparticles includes a step of contacting a steel-AERC, such as one defined by Formulae I or II, with a solvent and a ligand. Contacting a steel-AERC with a suitable solvent and/or ligand will result in formation of steel nanoparticles 210 having alloy composition dictated by the composition of the steel-AERC, and thus by the composition of the pre-steel mixture from which the steel-AERC was formed.

Non-limiting examples of suitable ligands can include nonionic, cationic, anionic, amphoteric, zwitterionic, and polymeric ligands and combinations thereof. Such ligands typically have a lipophilic moiety that is hydrocarbon based, organosilane based, or fluorocarbon based. Without implying limitation, examples of types of ligands which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, nitriles, alkyl amines, quaternary ammonium salts, carboxybetaines, sulfobetaines, or polymeric ligands. In some particular implementations, a ligand can be at least one of a nitrile, an amine, and a carboxylate.

Non-limiting examples of suitable solvents can include any molecular species, or combination of molecular species, capable of interacting with the constituents of an AERC by means of non-bonding or transient-bonding interactions. In different implementations, a suitable solvent for synthesis of steel nanoparticles 210 from a steel-AERC can be a hydrocarbon or aromatic species, including but not limited to: a straight-chain, branched, or cyclic alkyl or alkoxy; or a monocyclic or multicyclic aryl or heteroaryl. In some implementations, the solvent will be a non-coordinating or sterically hindered ether. The term solvent as described can in some variations include a deuterated or tritiated form. In some implementations, a solvent can be an ether, such as THF.

The present invention is further illustrated with respect to the following examples. It needs to be understood that these examples are provided to illustrate specific embodiments of the present invention and should not be construed as limiting the scope of the present invention.

Example 1. Steel Nanoparticle Synthesis

To a ball mill jar is added 0.0136 g carbon, 0.06 g manganese, 7.9264 g iron, and 6.28 g lithium borohydride. This is ball-milled under an inert atmosphere for 4 hours. The steel-AERC product is washed with THF, resulting in formation of steel nanoparticles having a composition 99.08% Fe, 0.17% C, and 0.75% Mn. The formed steel nanoparticles are isolated.

Example 2. Formation of Composite Steel

The steel nanoparticles of Example I are loaded into a punch and die with dispersed layers of a weave of p-aramid fibers. The steel nanoparticle powder is encouraged into the gaps between fibers of the weave of p-aramid fibers during this loading step. The material is then sintered at 430° C. and 60 MPa for 4 hours. The product is a composite steel having structural polymer integrated into a steel matrix as illustrated in FIGS. 1 and 2.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method for making a composite material, the method comprising:
   providing steel nanoparticles;
   combining the steel nanoparticles with a structural polymer component to produce an unannealed combination; and
   sintering the steel nanoparticles at a temperature less than 450° C. to produce a continuous steel matrix with the structural polymer component at least partially encapsulated therein.

2. The method as recited in claim 1, comprising synthesizing the steel nanoparticles by:
   contacting an Anionic Element Reagent Complex (AERC) with a solvent, the AERC having a formula:

$Fe_aC_bM_dX_y,$ where Fe is elemental iron, formally in oxidation state zero; C is elemental carbon, formally in oxidation state zero; M represents one or more elements in oxidation state zero, each of the one or more elements selected from a group including Mn, Ni, Cr, Mo, B, Ti, V, W, Co, Nb, P, S, and Si; X is a hydride molecule; a is a fractional or integral value greater than zero; b is a fractional or integral value greater than zero; d is a fractional or integral value greater than or equal to zero; and y is a fractional or integral value greater than or equal to zero.

3. The method as recited in claim 2, comprising forming the AERC by ball-milling a mixture comprising:
   a powder of a hydride molecule; and
   a pre-steel mixture that includes,
   iron powder; and
   carbon powder.

4. The method as recited in claim 3, wherein the pre-steel mixture comprises a powder of one or more elements selected from a group including Mn, Ni, Cr, Mo, B, Ti, V, W, Co, Nb, P, S, and Si.

5. The method as recited in claim 1, wherein the structural polymer component comprises an aromatic polyamide.

6. The method as recited in claim 1, wherein the structural polymer component comprises a para-aramid.

7. The method as recited in claim 1, wherein the structural polymer component comprises a plurality of spatially separated layers of structural polymer.

8. The method as recited in claim 1, wherein the structural polymer component is fully encapsulated within the continuous steel matrix.

9. The method as recited in claim 1, wherein the continuous steel matrix with the structural polymer component has density less than 7 g/cm$^3$.

10. The method as recited in claim 1, wherein the continuous steel matrix with the structural polymer component has density less than 6 g/cm$^3$.

11. The method as recited in claim 1, wherein the continuous steel matrix with the structural polymer component has density less than 5 g/cm$^3$.

12. The method as recited in claim 1, wherein the continuous steel matrix comprises an alloy of iron, carbon, and at least one element selected from a group including: Mn, Ni, Cr, Mo, B, Ti, V, W, Co, Nb, P, S, and Si.

13. A method for making a composite material, the method comprising:
   providing steel nanoparticles having an average maximum dimension less than about 20 nm;
   combining the steel nanoparticles with a structural polymer component to produce an unannealed combination; and
   sintering the steel nanoparticles at a temperature less than 450° C. to produce a continuous steel matrix with the structural polymer component at least partially encapsulated therein.

14. The method as recited in claim 13, comprising synthesizing the steel nanoparticles by:
   contacting an Anionic Element Reagent Complex (AERC) with a solvent, the AERC having a formula:

$Fe_aC_bM_dX_y,$ where Fe is elemental iron, formally in oxidation state zero; C is elemental carbon, formally in oxidation state zero; M represents one or more elements in oxidation state zero, each of the one or more elements selected from a group including Mn, Ni, Cr, Mo, B, Ti, V, W, Co, Nb, P, S, and Si; X is a hydride molecule; a is a fractional or integral value greater than zero; b is a fractional or integral value greater than zero; d is a fractional or integral value greater than or equal to zero; and y is a fractional or integral value greater than or equal to zero.

15. The method as recited in claim 14, comprising forming the AERC by ball-milling a mixture comprising:
   a powder of a hydride molecule; and
   a pre-steel mixture that includes iron powder and carbon powder.

16. The method as recited in claim 13, wherein the structural polymer component comprises an aromatic polyamide.

17. The method as recited in claim 13, wherein the structural polymer component comprises a plurality of spatially separated layers of structural polymer.

18. The method as recited in claim 13, wherein the structural polymer component is fully encapsulated within the continuous steel matrix.

19. The method as recited in claim 15, wherein the pre-steel mixture comprises a powder of one or more elements selected from a group including Mn, Ni, Cr, Mo, B, Ti, V, W, Co, Nb, P, S, and Si.

* * * * *